United States Patent [19]

Kamiya

[11] Patent Number: 4,519,472
[45] Date of Patent: * May 28, 1985

[54] MOTORCYCLE

[75] Inventor: Tadashi Kamiya, Niiza, Japan

[73] Assignee: Honda Giken Kogyo Kabushiki Kaisha, Tokyo, Japan

[*] Notice: The portion of the term of this patent subsequent to Nov. 2, 1999 has been disclaimed.

[21] Appl. No.: 407,804

[22] Filed: Aug. 13, 1982

Related U.S. Application Data

[62] Division of Ser. No. 152,102, May 21, 1980, Pat. No. 4,356,877.

[30] Foreign Application Priority Data

May 26, 1979 [JP] Japan .................................. 54-65236

[51] Int. Cl.³ ............................................. B62K 25/20
[52] U.S. Cl. ..................................... 180/227; 280/284
[58] Field of Search ............................... 180/227, 225; 280/281 R, 281 B, 284, 285

[56] References Cited

U.S. PATENT DOCUMENTS 4,356,877 11/1982 Kamiya ................................ 280/284

FOREIGN PATENT DOCUMENTS 458083 1/1950 Italy ...................................... 280/284
104022 2/1917 United Kingdom ................ 180/227

*Primary Examiner*—David M. Mitchell
*Assistant Examiner*—Ross Weaver
*Attorney, Agent, or Firm*—Armstrong, Nikaido, Marmelstein & Kubovcik

[57] ABSTRACT

There is disclosed a method of vehicle construction for improving the rate of production of two assemblies of a motorcycle. The two assemblies can be made simultaneously on separate assembly lines and connected together by placing the power unit in fitting engagement with the vehicle frame and, more particularly, with a shell structure forming part of the vehicle frame. In the second assembly including the power unit, the rear fork is pivotally connected with the power unit on an axis substantially aligned with that of the output shaft of the latter.

3 Claims, 9 Drawing Figures

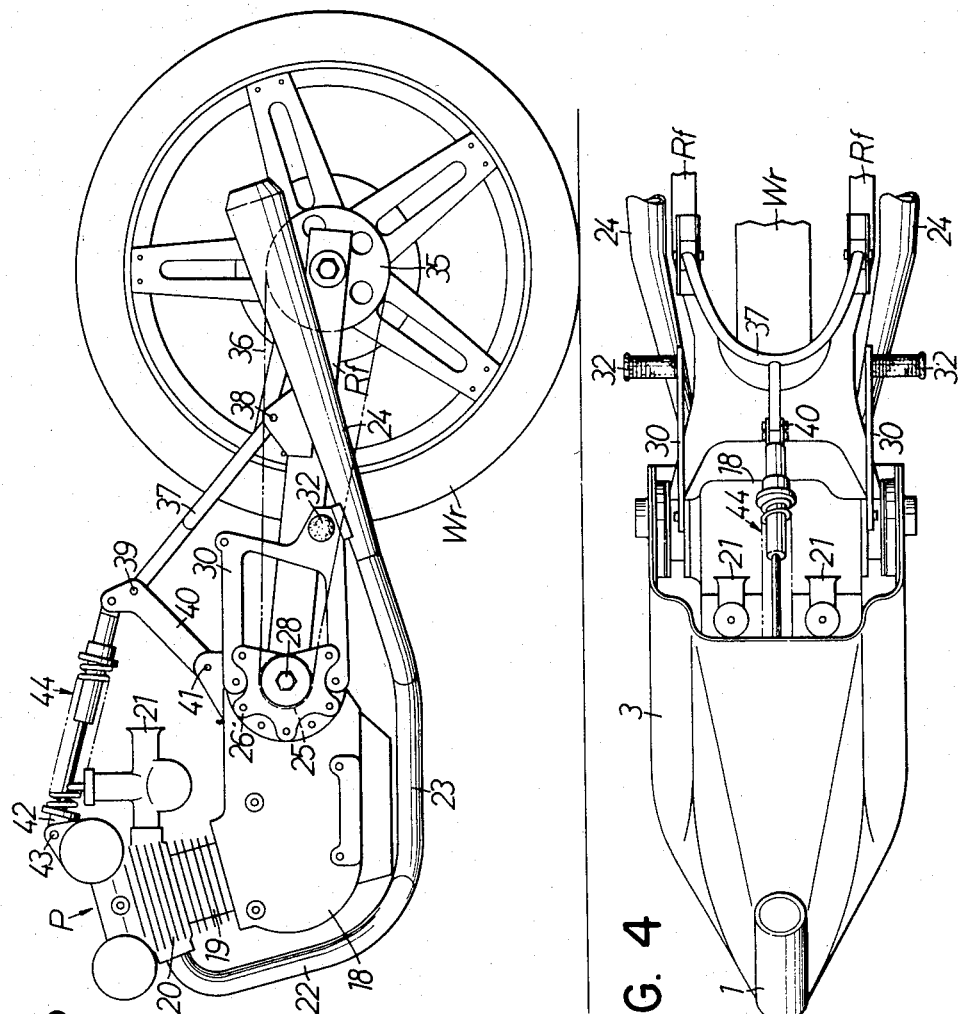
FIG. 3
FIG. 4
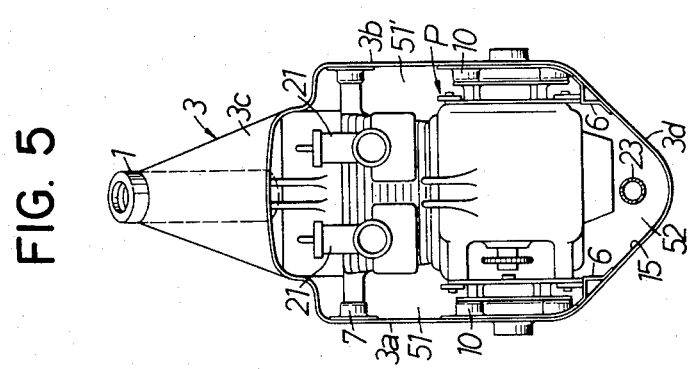
FIG. 5

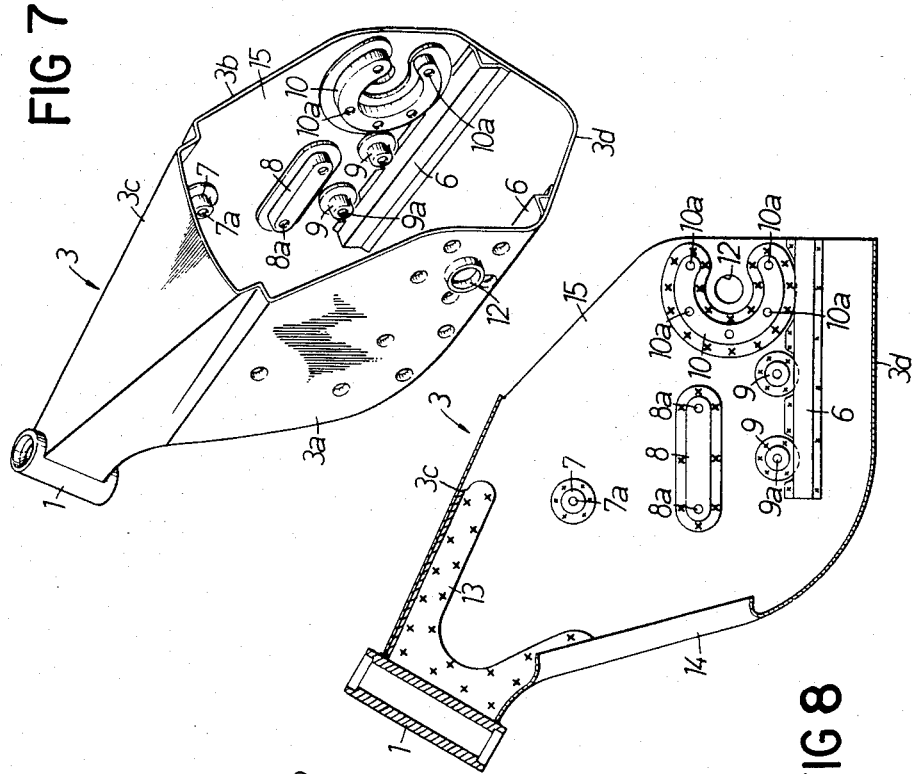

MOTORCYCLE

This is a division of application Ser. No. 152,102, filed May 21, 1980, now U.S. Pat. No. 4,356,877.

BACKGROUND OF THE INVENTION

This invention relates to two-wheeled motorcycles of the type including a power unit, a rear fork and a rear shock absorber and is intended to improve the manufacture of such motorcycles by assembling such vehicle components into a unitary structure to be assembled with the vehicle frame.

In conventional two-wheeled motorcycles, it has been general practice to assemble the vehicle by fitting components such as a front fork, a rear fork, a rear shock absorber and a power unit to the vehicle frame in succession. In such process, however, more than one assembly step cannot be completed at one time and any possible reduction in the total time required for the assembly operation must be very limited.

SUMMARY OF THE INVENTION

The present invention has for its primary object the provision of a two-wheeled motorcycle which includes at least two assemblies that can be formed independently from each other, thus representing an improvement in mass production. According to the present invention, there is provided a two-wheeled motorcycle which is characterized in that it comprises a vehicle frame and a power unit, rear fork and rear shock absorber assembly which includes a power unit designed to be directly connected to the vehicle frame, a rear fork pivotally connected with the power unit substantially in axial alignment with the output shaft of the power unit and supporting a rear wheel in driving connection with the latter, and a rear shock absorber arranged between the power unit and the rear fork to cushion the latter in vertical rocking movement.

The above and other objects, features and advantages of the present invention will become more apparent with reference to the following description when considered in connection with the accompanying drawings, which illustrate one preferred embodiment of the invention.

BRIEF DESCRIPTION OF THE DRAWINGS

In the drawings:

FIG. 3 is a side elevation of the power unit, rear fork and rear shock absorber assembly;

FIGS. 4 and 5 are views, respectively, taken along the lines IV—IV and V—V in FIG. 2, looking in the direction of the arrows;

FIG. 7 is an oblique view of the shell structure;

FIG. 8 is a side elevational view, in longitudinal cross section, of the shell structure; and FIG. 9 is a rear view of same.

DESCRIPTION OF THE PREFERRED EMBODIMENT

Figure 1:
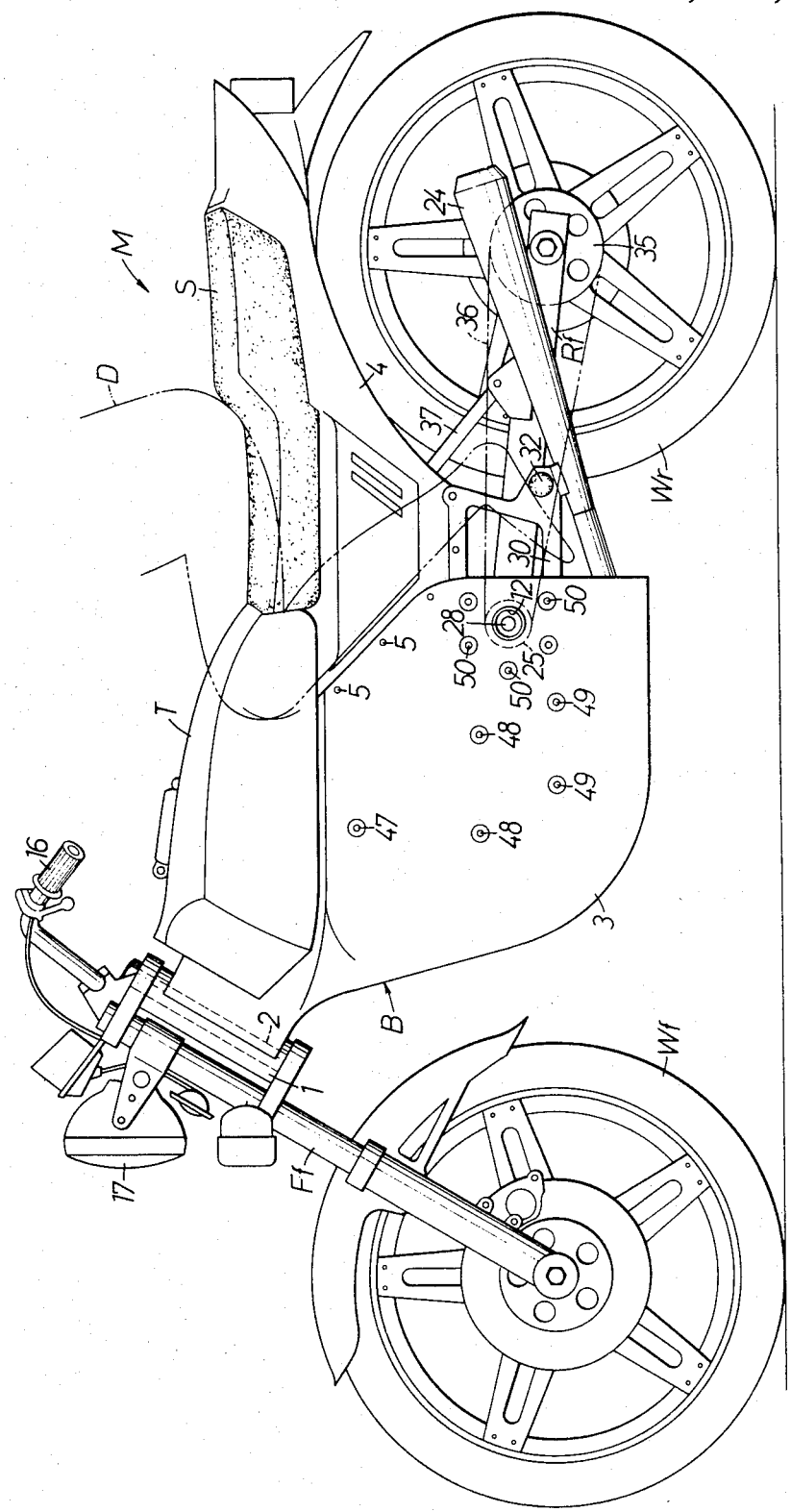
FIG. 1 is a general side elevational view of a two-wheeled motorcycle embodying the principles of the present invention.
Figure 2:
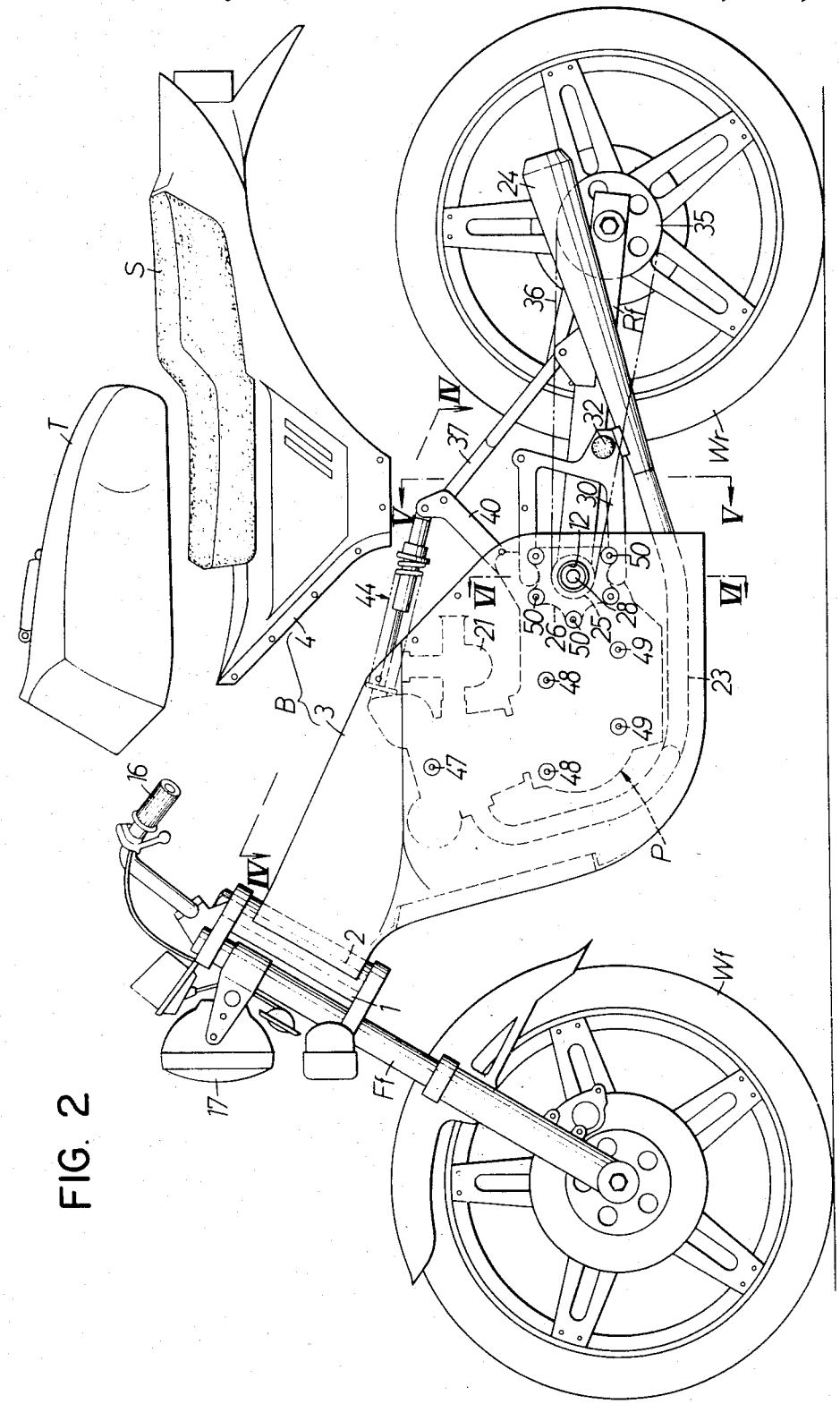
FIG. 2 is a view similar to FIG. 1, of the same with the fuel tank and seat-stay assembly shown detached from the vehicle frame.

Referring to the drawings and first to FIGS. 1 and 2, the two-wheeled motorcycle illustrated, M, consists of a vehicle frame B having a head pipe 1 disposed at the front end thereof, a front fork $F_f$ mounted on the head pipe 1 through the intermediary of a steering shaft 2 to support a front wheel $W_f$, a rear-wheel driving power unit P accommodated in the vehicle frame B, and a rear fork $R_f$ pivotally connected to the power unit P to support a rear wheel $W_r$. Description will be made below of the construction and arrangement of these vehicle components in order.

First, the vehicle frame B comprises a shell structure 3 of thin sheet material firmly secured to the head pipe 1 and extending rearwardly and downward therefrom and a seat stay 4, of channel cross section, detachably connected to the rear end of a shell structure 3 by screw means 5 and covering the top of rear wheel $W_r$. The shell structure 3 includes a left and a right side section 3a and 3b, a roof section 3c interconnecting the side sections at their top, and a bottom section 3d interconnecting the side sections at their bottom. Further, the shell structure 3 is formed in its front and rear faces respectively with an air inlet opening 14 and an air outlet opening 15 and is as a whole streamlined in shape.

As clearly seen in FIGS. 7 and 8, a pair of guide rails 6 and a plurality of pairs of reinforcing and power unit supporting bosses 7 to 10 are fixed to the inside of the left and right side sections 3a and 3b of shell structure 3 as by welding in face-to-face relation to the adjacent sides of power unit P. As shown, the guide rails 6 extend horizontally in a front-to-rear direction and the bosses 10 in the rearmost pair are shaped in a circular arc (or C-shaped) and are axially aligned with the output shaft 11 of power unit P. The bosses 7 to 10 are formed therein with respective bolt holes 7a to 10a at appropriate locations, as shown, and among others, the bosses 10 are also formed each with a tool window or opening for tool insertion, 12, at its center.

The shell structure 3 described above is formed integral or in appropriately divided form of a lightweight material such as light alloy or synthetic resin and has no practically effective strength by itself. Reference numeral 13 indicates a patch member bonded to the inside surface of the top portion of shell structure 13 for local reinforcement thereof.

Provided on top of the shell structure 3 is a fuel tank T in straddling relation thereto. Mounted on the seat stay 4, which extends rearwardly from the fuel tank, is a seat S for the driver D to sit thereon in a straddling fashion.

The front fork $F_f$ is of telescopic construction with a steering handle 16 and a headlight 17 fitted, respectively, to the top end and the front face thereof.

Description will next be made of the power unit P: As best seen in FIG. 3, the power unit P includes a crankcase 18 and a multiple-barrel cylinder block 19 which extends upwardly from the front top of the crankcase and is inclined slightly forward. Connected to the top end of the cylinder block 19 is a cylinder head 20, to the rear face of which a plurality of carburetors 21 are secured. Secured to the front face of cylinder head 20 are a plurality of exhaust pipes 22 which are bent to extend downwardly along the front face of the power plant P and jointed under the latter to a common exhaust duct 23. The exhaust duct 23, extending rearwardly along the bottom of the power unit P in the medial plane thereof, is connected with an exhaust muffler 24, which is arranged adjacent to the rear fork $R_f$.

Figure 6:
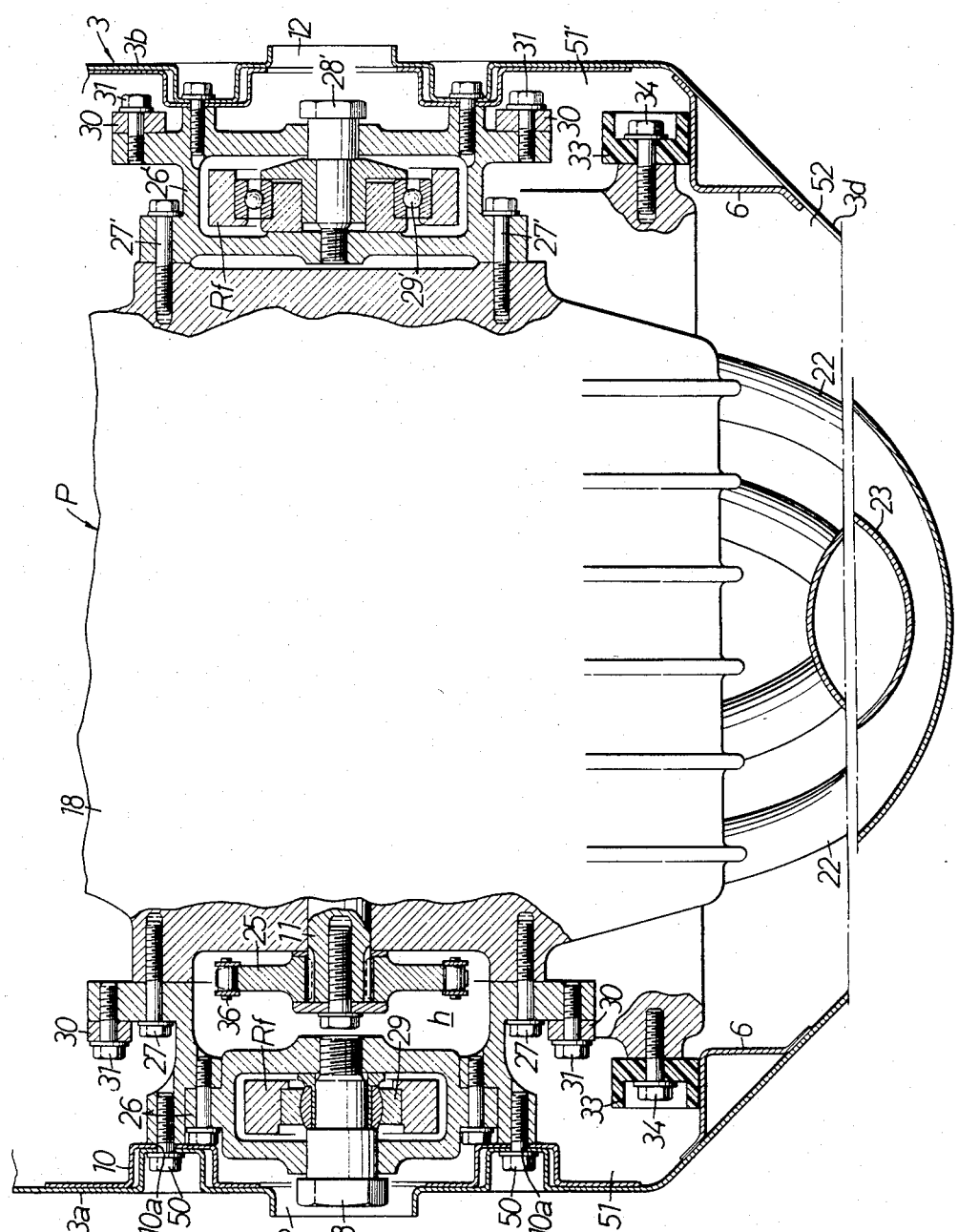
FIG. 6 is an enlarged cross-sectional view taken along the line VI—VI in FIG. 2.

As shown in FIG. 6, a driving sprocket wheel 25 is fixedly mounted on the output shaft 11 of power unit P, which extends exteriorly of the crankcase 18 through the left side wall thereof. An adapter 26 is fixed to the left side of the crankcase 18 by bolts 27, substantially covering the front half of the driving sprocket 25. Also, an adaptor 26' is fixed to the right side of the crankcase 18 by bolts 27' in a position opposite to the adapter 26. A pair of pivot shafts 28 and 28', arranged axially in alignment with the output shaft 11, are removably threaded in the respective adapters 26 and 26'. The rear fork $R_f$ is pivotally mounted at its right and left front basal ends on the pivot shafts 28 and 28' through the intermediary of respective bearings 29 and 29'.

Further, a pair of parallel brackets 30 are firmly secured to the respective adapters 26 and 26' by bolts 31 and, extending rearwardly therefrom, each serve not only to support a bar-like step member 32 but also the adjacent leg of exhaust muffler 24.

Provided on the right and left sides of the crankcase 18 are a pair of slide members of synthetic resin material 33 which are secured to the crankcase by bolts 34 and slidable over the respective guide rails 6 on the inside of the shell structure 3.

The rear wheel $W_r$, rotatably supported on the rear fork $R_f$ at the rear end thereof, has a driven sprocket wheel 35 secured coaxially thereto and a drive chain 36 is trained under tension between the driving and driven sprocket wheels 25 and 35, as shown. With this arrangement, the output of power unit P is transmitted from the output shaft 11 through the driving sprocket 25 and chain 36 to the driven sprocket 35 to drive the rear wheel $W_r$.

In order to prevent any unusual strain occurring in the area of pivotal connection of rear fork $R_f$, even with more or less deformation of the left leg of rear fork $R_f$ under the tension of drive chain 26, the bearing 29 on the pivot shaft 28, which lies adjacent to the output shaft 11 of power unit P, takes the form of a spherical bearing, as illustrated, so that smooth up and down rocking movement of the rear fork $R_f$ is ensured.

Further, since the output shaft 11 and pivot shafts 28 and 28' are arranged in axial alignement with each other, as described above, the distance between the driving and driven sprocket wheels 25 and 35 and hence the tension of the drive chain 36 remain unchanged at all times irrespective of the vertical position of rear fork $R_f$ in its rocking movement.

As shown in FIGS. 3 and 4, a bifurcated compression link 37 is pivotally supported at 38 at its basal, rear end by the rear fork $R_f$ in straddling relation to the rear wheel $W_r$ for free vertical rocking movement. This link 37 is pivotally connected at its distal end with an L-shaped rocker link 40 at its bent portion, as indicated at 39. The rocker link 40 is pivotally supported at its basal end on the top of crankcase 18 for fore and aft rocking movement. Arranged between the rocker link 40 and a mounting member 42, which is pivoted to a stationary member or the cylinder head 20 of the power unit as at 43 for vertical rocking movement, is a shock absorber 44 fitted with a suspension spring, as shown. In case of an ordinary motorcycle which has a cowling and a vehicle frame formed separately from each other, the stationary members may be the vehicle frame. It will be noted that the single suspension spring and shock absorber assembly 44 so arranged serves as an effective means for cushioning the rear fork $R_f$ in its vertical rocking movement during vehicle travel.

In the manner described above, the power unit P, rear fork $R_f$ and rear shock absorber 44 are put together to form a single assembly to be detachably fitted to the vehicle frame B.

In assembling the two-wheeled motorcycle M, first an assembly including the vehicle frame B and front fork $F_f$ and another including the power unit P, rear fork $R_f$ and rear shock absorber 44 are made at the same time in separate assembling lines and the two assemblies are subsequently connected together by fitting the power unit P in the first assembly to the vehicle frame B and more particularly to the shell structure 3 thereof in the manner described below.

First, the power unit P is inserted into the shell structure 3 through the air outlet opening 15, formed in its rear end face, by placing the slide members 33 in sliding engagement with the respective guide rails 6 until it is set in a predetermined position in the shell structure. Then, the bosses 7 to 10 on the opposite side sections 3a and 3b of the shell structure 3 are firmly fixed to the power unit P by means of fastening bolts 47 to 50, which are inserted into respective bolt holes 7a to 10a from outside of the shell structure 3. The C-shaped bosses 10 are, among others, clamped against the respective adapters 26 and 26' on the opposite sides of the power unit P with the result that the side sections 3a and 3b of the shell structure 3 are firmly secured to the power unit P particularly around the pivot shafts 28 and 28', on which the rear fork $R_f$ is mounted. In this manner, the power unit P serves solidly to interconnect the opposite side shell sections 3a and 3b, thus acting as a reinforcing or stiffening member for imparting a substantial practical strength to the shell structure.

With the shell structure 3 and power unit P joined together as described above, there are formed air passages 51, 51' and 52 between the power unit P and the left side section 3a, right side section 3b and bottom section 3d of the shell structure 3, respectively, which place the air inlet and outlet openings 14 and 15 in fluid communication with each other, the exhaust collecting duct 23 being positioned in the bottom air passage 52. During travel of the vehicle, it will be apparent that air flows into the shell structure 3 through the air inlet opening 14 formed at the front end thereof and, passing through the air passages 51, 51' and 52, acts to cool the power unit P and exhaust duct 23 in an efficient manner, finally flowing fast out of the shell structure through the air outlet opening 15.

In the normal position of the driver D during venicle travel, in which his feet are laid on the steps 32 with the fuel tank T held between his knees, as seen in FIG. 1, his legs are both held concealed behind the shell structure 3 and this, coupled with the streamlined configuration of the shell structure, substantially contributes to reduction in air resistance of the vehicle during travel.

Further, in the state of the power unit P fitted to the shell structure 3, when it is desired to separate the rear fork $R_f$ from the power unit P for maintenance work such as renewal of the drive chain 36, it is only required that an appropriate tool is inserted through the right and left tool windows 12 into the shell structure 3 in order to draw the pivot shafts 28 and 28' out of the respective bearings 29 and 29' thereby to disconnect the rear fork $R_f$ at its basal ends from the adapters 26 and 26', and there is no need for removing the power unit P once fitted to the shell structure 3 therefrom. This enables the maintenance operation to be performed with particular ease and efficiency.

To summarize, according to the present invention, the rearwheel supporting fork is pivotlly connected to the power unit with a rear shock absorber mounted therebetween to form a power unit, rear fork and rear shock absorber assembly, which is connected to the vehicle frame by way of the power unit in the assembly. This means that at least two assemblies, one including the vehicle frame and the other including the power unit, can be built up at the same time on separate assembly lines, enabling the total time required to assemble the vehicle to be widely reduced and thus contributing muct to improvement of the mass productivity of the vehicle. Also, such motorcycle can be readily disassembled into component assemblies and is particularly convenient for maintenance operation. Moreover, since, in the assembly including the power unit, the rear fork and the power unit are pivotally connected with each other on an axis substantially aligned with that of the output shaft of the power unit, the driving relationship between the output shaft and the rear wheel remains unchanged at all times irrespective of the angle of rocking movement of the rear fork to ensure efficient power transmission to the rear wheel while enhancing the durability of the transmission system.

Accordingly, while there have been shown and described the preferred embodiment of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:
1. A two wheeled motorcycle, comprising
   a frame member, and
   a power unit mounted on said frame member for driving a rear wheel,
   a rear fork pivotally mounted on said power unit and supporting said rear wheel in driving connection therewith,
   a compression link having a basal end and a distal end and pivotally mounted at its basal end on said rear fork in staddling relation to said rear wheel,
   a rocker link having opposite ends and pivotally mounted at one end thereof on said power unit and pivotally connected with the distal end of said compression link, and
   a rear shock absorber connected at one end thereof to said power unit and at the other end thereof to the other end of said rocker link.

2. The two-wheeled motorcycle of claim 1, wherein said compression link inclines upwardly at an angle toward said distal end; said rocker link is bar-like and has an L-shaped configuration consisting a long side portion which takes a slopingly upstanding position and is pivotally connected at a lower end thereof to said power unit, and a short side portion having an upper end and extending upwardly from said long side portion via a rearwardly projecting bent portion disposed near said upper end of said short side portion, said short side portion inclining at substantially the same angle as said angle of inclination of said compression link in the same direction as the latter, the distal end of the compression link being connected to said bent portion, said other end of said rear shock absorber being connected to the upper end of said short side portion of said rocker link.

3. The two-wheeled motorcycle of claim 1, wherein said rear shock abosorber is positioned below a fuel tank and a seat stay with its axis being laid in the longitudinal direction of the motorcycle and in a substantially horizontal plane.

* * * * *